US012518672B2

(12) United States Patent
Zhang et al.

(10) Patent No.: US 12,518,672 B2
(45) Date of Patent: Jan. 6, 2026

(54) DRIVING CHIP, LIGHT EMISSION DRIVER, METHOD FOR CONFIGURING PORTS OF THE DRIVING CHIP, BACKLIGHT MODULE AND DISPLAY APPARATUS

(71) Applicants: BOE MLED Technology Co., Ltd., Beijing (CN); BOE TECHNOLOGY GROUP CO., LTD., Beijing (CN)

(72) Inventors: Junwei Zhang, Beijing (CN); Wei Hao, Beijing (CN); Lingyun Shi, Beijing (CN); Xiaoyu Zhang, Beijing (CN)

(73) Assignees: BOE MLED Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/290,837

(22) PCT Filed: Jan. 19, 2023

(86) PCT No.: PCT/CN2023/073079

§ 371 (c)(1),
(2) Date: Jan. 22, 2024

(87) PCT Pub. No.: WO2024/152287

PCT Pub. Date: Jul. 25, 2024

(65) Prior Publication Data

US 2024/0428720 A1 Dec. 26, 2024

(51) Int. Cl.
*G09G 3/20* (2006.01)
*G09G 3/00* (2006.01)
(Continued)

(52) U.S. Cl.
CPC .......... *G09G 3/2096* (2013.01); *G09G 3/006* (2013.01); *G09G 3/32* (2013.01); *G09G 3/3426* (2013.01);
(Continued)

(58) Field of Classification Search
CPC ........ G09G 3/2096; G09G 3/006; G09G 3/32; G09G 3/3426; G09G 3/3677;
(Continued)

(56) References Cited

U.S. PATENT DOCUMENTS 7,257,763 B1 * 8/2007 Srinivasan .......... G06F 11/1064 714/764
2014/0168037 A1 * 6/2014 Sakariya .................. G09G 3/32 345/82
(Continued)

FOREIGN PATENT DOCUMENTS

CN 101340757 A 1/2009
CN 201570232 U 9/2010
(Continued)

OTHER PUBLICATIONS

WIPO, International search report, Dec. 29, 2022, Appl'n No. PCT/CN2022/105751.
(Continued)

*Primary Examiner* — Antonio Xavier
(74) *Attorney, Agent, or Firm* — HOUTTEMAN LAW LLC

(57) ABSTRACT

The present disclosure provides a driving chip, which includes: a first signal port and a second signal port; a logic control module connected to the first signal port and the second signal port, the logic control module being configured to configure, according to a configuration signal received by the first signal port or the second signal port, one of the first signal port or the second signal port as a signal
(Continued)

input port, configure the other of the first signal port or the second signal port as a signal output port, and output the configuration signal or an updated configuration signal through the signal output port. The present disclosure further provides a method for configuring ports of the driving chip, a light emission driver, a backlight module and a display apparatus.

14 Claims, 7 Drawing Sheets

(51) Int. Cl.
*G09G 3/32* (2016.01)
*G09G 3/34* (2006.01)
*G09G 3/36* (2006.01)

(52) U.S. Cl.
CPC ... *G09G 3/3677* (2013.01); *G09G 2310/0264* (2013.01); *G09G 2310/0286* (2013.01); *G09G 2330/02* (2013.01); *G09G 2330/12* (2013.01)

(58) Field of Classification Search
CPC ... G09G 2310/0264; G09G 2310/0286; G09G 2330/02; G09G 2330/12; G09G 3/20; G09G 3/34
See application file for complete search history.

(56) References Cited

U.S. PATENT DOCUMENTS

| | | | | |
|---|---|---|---|---|
| 2022/0028337 | A1 | 1/2022 | Wei et al. | |
| 2022/0198992 | A1* | 6/2022 | Nayanov .............. | G09G 3/2096 |
| 2022/0319452 | A1 | 10/2022 | Yang et al. | |

FOREIGN PATENT DOCUMENTS

| | | | |
|---|---|---|---|
| CN | 101882420 | A | 11/2010 |
| CN | 202907302 | U | 4/2013 |
| CN | 104361864 | A | 2/2015 |
| CN | 106952608 | A | 7/2017 |
| CN | 108513393 | A | 9/2018 |
| CN | 111341247 | A | 6/2020 |
| CN | 112654119 | A | 4/2021 |
| CN | 114093314 | A | 2/2022 |
| CN | 114974140 | A | 8/2022 |
| CN | 114999409 | A | 9/2022 |
| CN | 115002969 | A | 9/2022 |
| CN | 115188324 | A | 10/2022 |
| JP | 2004172684 | A | 6/2004 |
| WO | 2022266810 | A1 | 12/2022 |

OTHER PUBLICATIONS

European Patent Office, Extended European Search Report, Aug. 6, 2025, for corresponding EP application No. 23916770.3.

* cited by examiner

DRIVING CHIP, LIGHT EMISSION DRIVER, METHOD FOR CONFIGURING PORTS OF THE DRIVING CHIP, BACKLIGHT MODULE AND DISPLAY APPARATUS

TECHNICAL FIELD

The present disclosure relates to the field of display technology, and in particular to a driving chip, a light emission driver, a method for configuring ports of the driving chip, a backlight module and a display apparatus.

BACKGROUND

With the development of LCD display technology, the display technology adopting a Mini-LED backlight matrix as a backlight source of a display panel has become one of important technological development directions at present. Compared to traditional LED backlight modules, Mini-LED backlight modules have the advantages of smaller size, more controllable partitions, and shorter mixing distance, and thus can result in better display performance. It is needed to configure a large number of driving chips in the Mini-LED backlight module to drive Mini-LEDs to emit light, and each driving chip can usually drive multiple Mini-LEDs.

SUMMARY

In a first aspect, the present disclosure provides a driving chip, including: a first signal port and a second signal port; a logic control module connected to the first signal port and the second signal port, the logic control module being configured to configure, according to a configuration signal received by the first signal port or the second signal port, one of the first signal port or the second signal port as a signal input port, configure the other of the first signal port or the second signal port as a signal output port, and output the configuration signal or an updated configuration signal through the signal output port.

In some implementations, the driving chip further includes: a storage module having stored therein correspondences between various configuration rules and configuration sub-signals, the logic control module includes: a first determination sub-circuit configured to determine a target configuration sub-signal corresponding to the driving chip according to the configuration signal received by the first signal port or the second signal port and a preset communication rule; a second determination sub-circuit configured to determine a target configuration rule corresponding to the target configuration sub-signal according to the target configuration sub-signal and the correspondences; and a configuration sub-circuit configured to configure, according to the target configuration rule, one of the first signal port or the second signal port as the signal input port and the other of the first signal port or the second signal port as the signal output port.

In some implementations, the configuration signal includes: at least one configuration sub-signal and a flag signal located following the at least one configuration sub-signal; the preset communication rule includes: acquiring a first configuration sub-signal in the configuration signal, and taking the first configuration sub-signal as the target configuration sub-signal corresponding to the driving chip; the configuration sub-circuit is further configured to remove the target configuration sub-signal from the configuration signal to obtain the updated configuration signal, and output the updated configuration signal through the signal output port.

In some implementations, the logic control module includes: a first judgment sub-circuit configured to compare a voltage signal received by the first signal port with a reference voltage and output a first judgment signal in response to that the voltage signal received by the first signal port is greater than or equal to the reference voltage; a second judgment sub-circuit configured to compare a voltage signal received by the second signal port with the reference voltage and output a second judgment signal in response to that the voltage signal received by the second signal port is greater than or equal to the reference voltage; and a logic judgment sub-circuit, connected to the first judgment sub-circuit and the first signal port, configured to determine, in response to the first judgment signal, that the voltage signal received by the first signal port is the configuration signal, configure the first signal port as the signal input port and configure the second signal port as the signal output port, and transmit the configuration signal to the second signal port; and configured to determine, in response to the second judgment signal, the voltage signal received by the second signal port is the configuration signal, configure the second signal port as the signal input port and configure the first signal port as the signal output port, and transmit the configuration signal to the first signal port.

In some implementations, the first judgment sub-circuit includes: a first voltage comparator having a first input terminal connected to the first signal port and a second input terminal connected to a reference voltage terminal, configured to compare the voltage signal received by the first signal port with the reference voltage and output a first voltage signal in response to that the voltage signal received by the first signal port is greater than or equal to the reference voltage; a first judgment unit, connected with an output terminal of the first voltage comparator and the first signal port, and configured to transmit the voltage signal received by the first signal port to the logic judgment sub-circuit; and output, in response to the first voltage signal, the first judgment signal to the logic judgment sub-circuit.

In some implementations, the second judgment sub-circuit includes: a second voltage comparator having a first input terminal connected to the second signal port and a second input terminal connected to the reference voltage terminal, configured to compare the voltage signal received by the second signal port with the reference voltage and output a second voltage signal in response to that the voltage signal received by the second signal port is greater than or equal to the reference voltage; and a second judgment unit, connected with an output terminal of the second voltage comparator and the second signal port, and configured to transmit the voltage signal received by the second signal port to the logic judgment sub-circuit; and output, in response to the second voltage signal, a second judgment signal to the logic judgment sub-circuit.

In some implementations, the signal input port is configured to receive an address signal; the logic control module is further configured to configure address information of the driving chip according to the address signal and generate a relay signal; and the signal output port is configured to generate the relay signal.

In some implementations, the driving chip further includes: at least one driving port electrically connected with the logic control module; a first function port electrically connected with the logic control module and configured to receive driving data, and the driving data includes a plurality of address verification information and a plurality of driving information corresponding to the plurality of address verification information, the logic control module is further configured to receive, in response to that the address verification information matches an address of the driving chip, corresponding driving information according to the address verification information, and generate a driving current corresponding to the at least one driving port according to the driving information.

In some implementations, the first function port is further configured to receive a test signal including test data and general address information, the general address information is matched with address information of any driving chip; and the logic control module is further configured to generate a test current flowing through any driving port according to the test data.

In some implementations, the driving chip further includes: at least one ground port electrically connected with the logic control module and configured to receive a ground signal.

In some implementations, the driving chip further includes: a power port electrically connected with the logic control module and configured to receive a power signal.

In a second aspect, the present disclosure further provides a light emission driver, including a driving circuit board and a plurality of driving chips cascaded, each driving chip is the driving chip described above; the driving circuit board is connected with the first signal port or the second signal port of the driving chip at a first stage, and the first signal port or the second signal port of the driving chip at a last stage, and is configured to output the configuration signal to the driving chip at the first stage and receive a signal output by the driving chip at the last stage.

In some implementations, the light emission driver further includes: a base substrate including a light-emitting region and a bonding region located on a side of the light-emitting region, a plurality of bonding pads are arranged in the bonding region, and the driving circuit board is connected with the driving chip through the bonding pads; the plurality of driving chips are located in the light-emitting region and are arranged in N driving chip columns, and each driving chip column includes multiple driving chips which are sequentially arranged along a direction away from the bonding region; the driving chip which is farthest away from the bonding region in the $n^{th}$ driving chip column is cascaded with the driving chip which is farthest away from the bonding region in the $(n+1)^{th}$ driving chip column, N is an integer greater than 1, and n is an odd number less than N.

In some implementations, for each driving chip, the first input port is located at a side of the driving chip close to the bonding region, and the second signal port is located at a side of the driving chip away from the bonding region; the second signal port of the driving chip which is farthest away from the bonding region in the $n^{th}$ driving chip column is connected with the second signal port of the driving chip which is farthest away from the bonding region in the $(n+1)^{th}$ driving chip column; and N is an even number, and the first signal port of the driving chip at the first stage and the first signal port of the driving chip at the last stage are connected with the driving circuit board.

In some implementations, the light emission driver further includes: a conductive layer on a base substrate, the conductive layer includes a first transmission line; the driving chip is located on a side, away from the base substrate, of the conductive layer, and further includes a first function port, and the first function port is electrically connected with the driving circuit board through the first transmission line.

In some implementations, the light emission driver further includes: a conductive layer on a base substrate, the conductive layer includes a second transmission line; the driving chip is located on a side, away from the base substrate, of the conductive layer, and further includes a power port, and the power port is connected with a power supply terminal of the driving circuit board through the second transmission line.

In a third aspect, the present disclosure further provides a backlight module, which includes the above-mentioned light emission driver and a plurality of light-emitting devices, each of the driving chips is connected to at least one of the light-emitting devices, and is configured to drive the light-emitting device to emit light.

In a fourth aspect, the present disclosure further provides a display apparatus, which includes the backlight module described above.

In a fifth aspect, the present disclosure further provides a method for configuring ports of a driving chip, the driving chip includes a first signal port and a second signal port, and the method includes: configuring, according to a configuration signal received by the first signal port or the second signal port, one of the first signal port or the second signal port as a signal input port, and the other of the first signal port or the second signal port as a signal output port, and outputting the configuration signal or an updated configuration signal through the signal output port.

In some implementations, the configuring, according to a configuration signal received by the first signal port or the second signal port, one of the first signal port or the second signal port as a signal input port, and the other of the first signal port or the second signal port as a signal output port includes: determining a target configuration sub-signal corresponding to the driving chip according to the configuration signal received by the first signal port or the second signal port and a preset communication rule; determining a target configuration rule corresponding to the target configuration sub-signal according to the target configuration sub-signal and correspondences between various configuration rules and configuration sub-signals; configuring one of the first signal port or the second signal port as the signal input port and the other of the first signal port or the second signal port as the signal output port according to the target configuration rule.

In some implementations, the configuration signal includes: at least one configuration sub-signal and a flag signal located following the at least one configuration sub-signal; the preset communication rule includes: acquiring a first configuration sub-signal in the configuration signal, and taking the first configuration sub-signal as the target configuration sub-signal corresponding to the driving chip; the outputting the configuration signal or an updated configuration signal through the signal output port specifically includes: removing the target configuration sub-signal from the configuration signal to obtain the updated configuration signal, and outputting the updated configuration signal through the signal output port.

In some implementations, the configuring, according to a configuration signal received by the first signal port or the second signal port, one of the first signal port or the second signal port as a signal input port, and the other of the first signal port or the second signal port as a signal output port includes: comparing a voltage signal received by the first signal port with a reference voltage, and outputting a first judgment signal in response to that the voltage signal received by the first signal port is greater than or equal to the reference voltage; comparing a voltage signal received by the second signal port with the reference voltage, and outputting a second judgment signal in response to that the voltage signal received by the second signal port is greater than or equal to the reference voltage; determining, in response to the first judgment signal, the voltage signal received by the first signal port as the configuration signal, configuring the first signal port as the signal input port, configuring the second signal port as the signal output port, and transmitting the configuration signal to the second signal port; and determining, in response to the second judgment signal, the voltage signal received by the second signal port as the configuration signal, configuring the second signal port as the signal input port, configuring the first signal port as the signal output port, and transmitting the configuration signal to the first signal port.

BRIEF DESCRIPTION OF DRAWINGS

The accompanying drawings, which are included to provide a further understanding of the present disclosure and are incorporated in and constitute a part of this specification, illustrate embodiments of the present disclosure and together with the description serve to explain the present disclosure, but do not constitute a limitation of the present disclosure.

DETAIL DESCRIPTION OF EMBODIMENTS

Embodiments of the present disclosure will be described in detail below with reference to accompanying drawings. It should be understood that the specific embodiments described here are only for the purpose of explaining and interpreting the present disclosure, and are not intended to limit the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and are not all embodiments. All other embodiments, which can be derived by a person skilled in the art from the described embodiments of the present disclosure without increative labor, are within the protective scope of the present disclosure.

The terms used here for describing the embodiments of the present disclosure are not intended to limit and/or define the scope of the present disclosure. For example, unless otherwise defined, technical or scientific terms used herein shall have the ordinary meaning as understood by one of ordinary skill in the art to which the present disclosure belongs. It should be understood that the terms "first," "second," and the like, as used in the present disclosure, do not denote any order, quantity, or importance, but rather are used to distinguish one element from another. Unless the context clearly indicates otherwise, the singular forms "a," "an," or "the" and similar referents do not denote a limitation of quantity, but rather denote the presence of at least one. The word "comprising/including" or "comprises/includes", and the like, means that the element or item appearing in front of the word "comprising/including" or "comprises/includes" contains the element or item listed after the word "comprising/including" or "comprises/includes" and its equivalents, and does not exclude other elements or items. The terms "connecting/connected" or "coupling/coupled" and the like are not restricted to physical or mechanical connections, but may include electrical connections, whether direct or indirect. Terms "upper/on", "lower/under", "left", "right", and the like are used merely to indicate relative positional relationships, which may change accordingly when the absolute position of the object being described changes.

It should be understood that the expression of "in response to a signal" in the embodiments of the present disclosure means "following receiving a signal".

Figure 1:
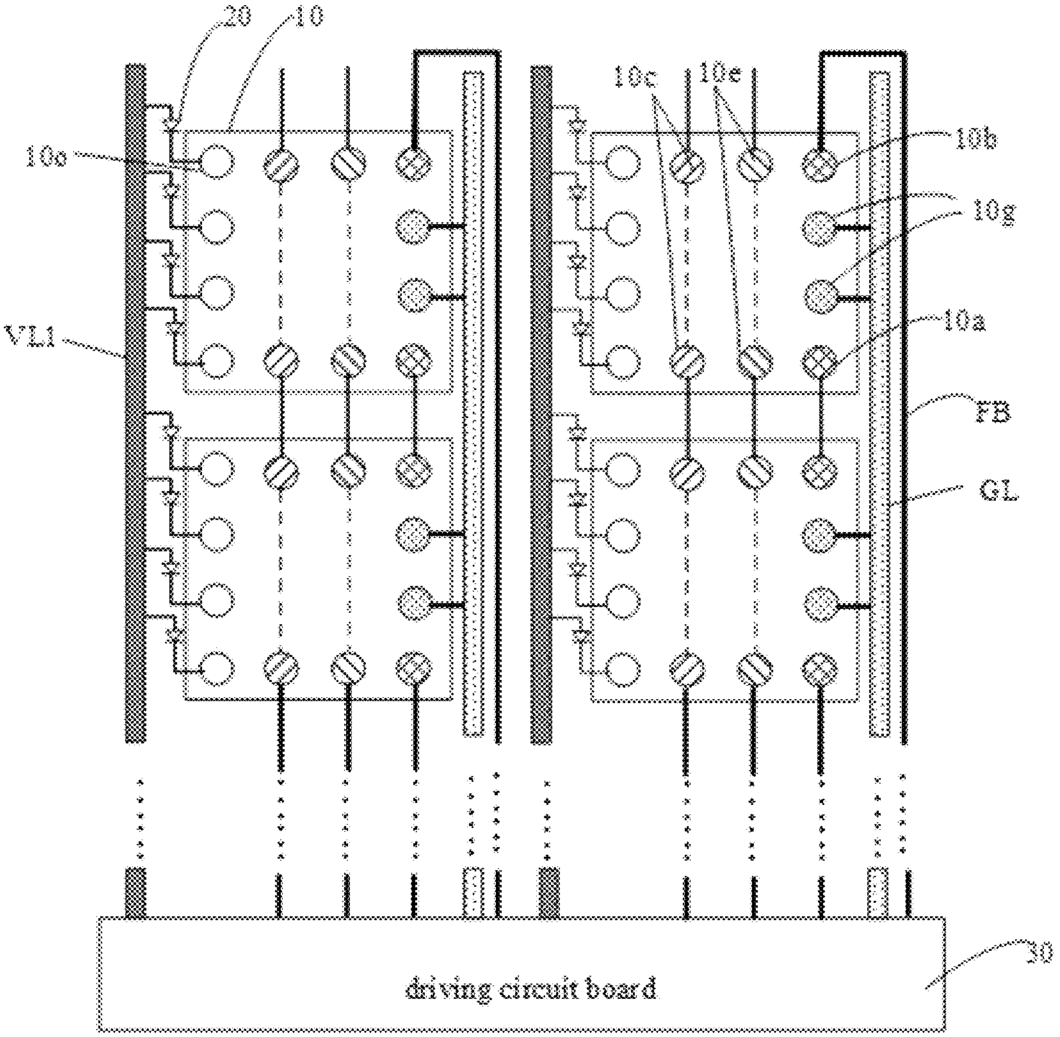
FIG. 1 is a schematic diagram of a light emission driver and a light-emitting device provided in some embodiments of the present disclosure.

FIG. 1 is a schematic diagram of a light emission driver and a light-emitting device provided in some embodiments, and as shown in FIG. 1, the light emission driver includes a driving circuit board and a plurality of driving chips arranged in an array. Multiple driving chips 10 arranged along a same direction form a driving chip column. Each of the driving chips 10 includes: a signal input port 10*a*, a signal output port 10*b*, a data input port 10*e*, a power port 10*c*, a ground port 10*g*, and a plurality of driving ports 10*o*. Each of the driving ports 10*o* is connected to one light-emitting device 20, for example, the driving port 10*o* is connected to a second electrode of the light-emitting device 20, and a first electrode of the light-emitting device 20 is connected to a first power terminal of the driving circuit board 30 through a first power line VL1. The first electrode of the light-emitting device 20 may be an anode and the second electrode of the light-emitting device 20 may be a cathode. The data input port 10*e* is connected to a data output terminal of the driving circuit board 30, the power port 10*c* is connected to a power supply terminal of the driving circuit board 30, and the ground port 10*g* is connected to a ground signal terminal of the driving circuit board 30 through a ground line GL. The power supply terminal is configured to provide an operating voltage for the driving chip 10 to ensure that the driving chip 10 can normally operate. In a process of controlling the light-emitting device 20 to emit light, the data output terminal of the driving circuit board 30 provides a data signal to the driving chip 10, and the driving chip 10 outputs a driving signal to the driving port 10*o* according to the data signal, thereby controlling the light-emitting device 20 to emit light. For example, a voltage provided by the first power terminal is a positive voltage V1, and in a case where the driving signal is a voltage signal less than the positive voltage V1, the light-emitting device 20 emits light, and in a case where the driving signal is a voltage signal greater than the positive voltage V1, the light-emitting device 20 is turned off.

The signal input port 10*a* and the signal output port 10*b* are configured to transmit configuration information, for example, address information of the driving chip 10. The signal input port 10*a* is configured to externally input a signal to the driving chip 10, and the signal output port 10*b* is configured to output a signal. For the driving chips, relative positions of the signal input port 10*a* and the signal output port 10*b* are consistent, thereby facilitating rapid arrangement of the driving chips 10. For example, in each of the driving chips 10, the signal output port 10*b* is farther away from the driving circuit board 30 than the signal input port 10*a*. The driving chips 10 in the same driving chip column are sequentially cascaded, the driving chip 10 closest to the driving circuit board 30 is at the first stage, and the driving chip 10 farthest from the driving circuit board 30 is at the last stage. In each driving chip column, the signal input port 10*a* of the driving chip 10 at the first stage is connected to a first configuration terminal of the driving circuit board 30, the signal input port 10*a* of each of the remaining driving chips 10 is connected to the signal output port 10*b* of the driving chip 10 at the previous stage, and the signal output port 10*b* of the driving chip 10 at the last stage is connected to a second configuration terminal of the driving circuit board 30 through a feedback signal line FB.

Before controlling the light-emitting device 20 to emit light, the driving chip is configured, for example, an address of the driving chip 10 is configured. In an example, the first configuration terminal of the driving circuit board 30 transmits a reference address (e.g., 000) to the driving chip 10 at the first stage, and the driving chip 10 at the first stage takes the reference address as its own address, adds 1 to the address and outputs the resulting address to the signal output port 10*b*. The driving chip 10 at each stage following the driving chip 10 at the first stage takes an address received by itself as its own address, adds 1 to its own address and outputs the resulting address to the signal output port 10*b*. After receiving the address output by the driving chip 10 at the last stage, the second configuration terminal of the driving circuit board 30 determines that the address is configured completely, and the number of the driving chips 10 included in the driving chip column can be counted.

In the light emission driver shown in FIG. 1, the signal input port 10*a* of each driving chip 10 is located on a side of the driving chip 10 close to the driving circuit board 30, and the signal output port 10*b* is located on a side of the driving chip 10 away from the driving circuit board 30, which makes that it is difficult to cascade the driving chips 10 in different driving chip columns. The reason is that: in a case where wires are located in a same layer, if two adjacent driving chip columns are cascaded, connection lines connecting the two driving chip columns may be intersected with other signal lines (such as the first power line VL1), resulting short-circuit therebetween; if the connection lines connecting the two adjacent driving chip columns are disposed in a different layer from other signal lines, the process complexity will be increased.

Moreover, in the light emission driver shown in FIG. 1, the feedback signal line FB between the driving chip 10 at the last stage in each driving chip column and the driving circuit board 30 is relative long, resulting in a relatively large transmission resistance, thereby affecting the signal transmission quality.

Figure 2:
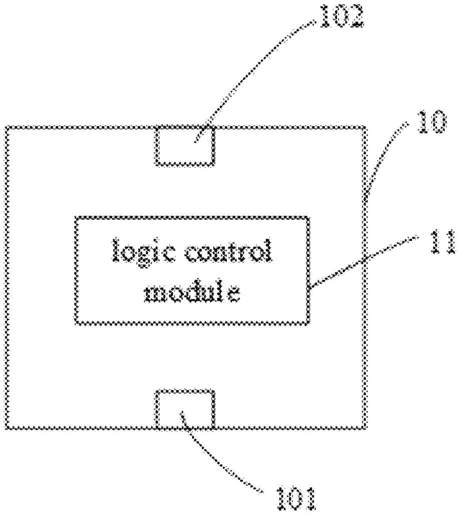
FIG. 2 is a schematic diagram of a driving chip provided in some embodiments of the present disclosure.

FIG. 2 is a schematic diagram of a driving chip provided in some embodiments of the present disclosure, and as shown in FIG. 2, the driving chip 10 includes: a first signal port 101, a second signal port 102 and a logic control module 11. The logic control module 11 is connected to the first signal port 101 and the second signal port 102, and the logic control module 11 is configured to configure, according to the configuration signal received by the first signal port 101 or the second signal port 102, one of the first signal port 101 or the second signal port 102 as a signal input port, the other of the first signal port 101 or the second signal port 102 as a signal output port, and to output the configuration signal or an updated configuration signal through the signal output port.

It should be noted that the configuration signal received by the first signal port 101 or the second signal port 102 is a configuration signal from an external device. For example, the configuration signal may be a configuration signal transmitted by another driving chip or a driving circuit board. One of the first signal port 101 or the second signal port 102 is configured as the signal input port, and the other of the first signal port 101 or the second signal port 102 is configured as the signal output port, so that a direction in which the signal is transmitted between the first signal port 101 and the second signal port 102 is determined.

In addition, in a case where a plurality of driving chips 10 are cascaded, processes for configuring functions of the first signal port 101 and the second signal port 102 of the driving chips 10 may be the same. The configuration signals received by different driving chips 10 may be the same or different. For example, the configuration signal output by each driving chip 10 is the same as the configuration signal received by itself, and in such case, the configuration signals received by different driving chips 10 are the same. For another example, the logic control module 11 of the driving chip 10 outputs the updated configuration signal through the signal output port, and in such case, the configuration signal received by the driving chip 10 at a certain stage may be different from the configuration signal received by the driving chip 10 at the previous stage.

Figure 3:
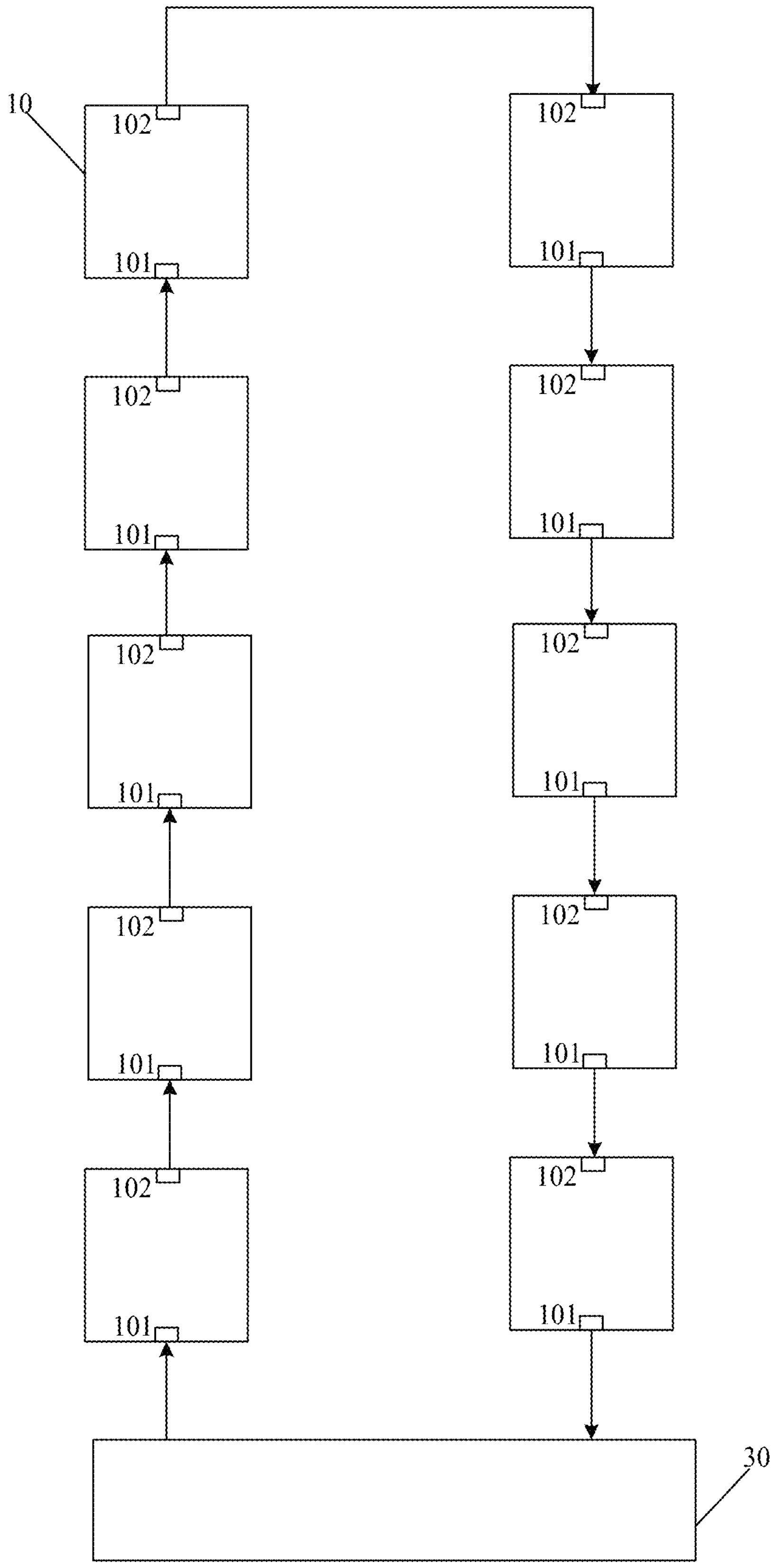
FIG. 3 is a schematic diagram of a plurality of driving chips cascaded provided in some embodiments of the present disclosure.

In the driving chip 10 provided in the embodiments of the present disclosure, in response to that the first signal port 101 or the second signal port 102 receives a configuration signal transmitted by another driving chip 10 or the driving circuit board 30, the logic control module 11 configures functions of the first signal port 101 and the second signal port 102 according to the configuration signal, so as to configure one of the first signal port 101 or the second signal port 102 as the signal input port and the other of the first signal port 101 and the second signal port 102 as the signal output port, respectively, and outputs the configuration signal or the updated configuration signal through the signal output port. That is, input/output functions of the first signal port 101 and the second signal port 102 in the driving chip 10 are not fixed, but are determined according to the configuration signal received by the driving chip 10. Therefore, in a case where the driving chips 10 in the embodiments of the present disclosure are applied to the light emission driver, as shown in FIG. 3, in the wiring design, the driving chips 10 in the same driving chip column are cascaded with each other, and then at least two adjacent driving chip columns are cascaded with each other; after being powered-on, a configuration signal is transmitted to the driving chip 10 at the first stage in the cascaded driving chips 10, so that the driving chip 10 at the first stage configures input and output functions of the first signal port 101 and the second signal port 102 according to the configuration signal, and outputs the configuration signal or an updated configuration signal to the driving chip 10 at the second stage through the signal output port, the driving chip 10 at the second stage configures the input and output functions of the first signal port 101 and the second signal port 102 according to the received configuration signal, and the rest can be deduced from above, until all driving chips 10 complete the configuration of the input and output functions of the first signal ports 101 and the second signal ports 102 thereof. It can be seen that, in the embodiments of the present disclosure, a plurality of adjacent driving chip columns are cascaded according to the shortest path, and the functions of the first signal port 101 and the second signal port 102 of each driving chip 10 are configured, so that the case, in which it is difficult to cascade different driving chip columns, in FIG. 1 is prevented from occurring.

Figure 4:
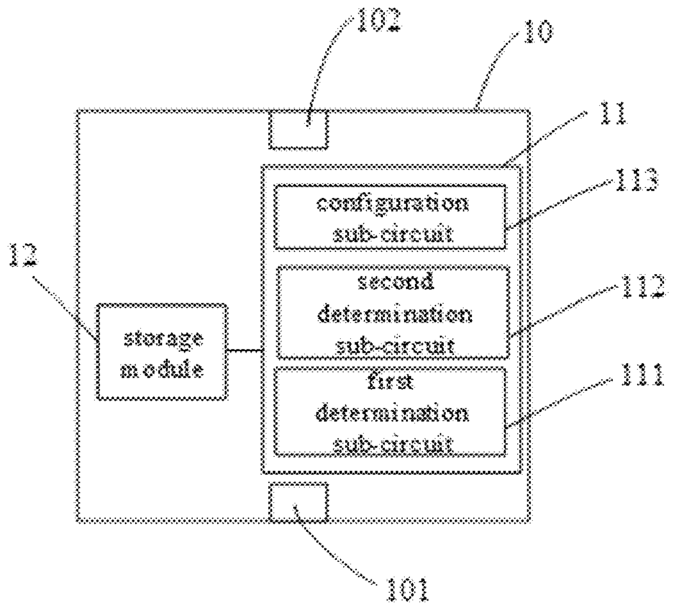
FIG. 4 is a schematic diagram of a driving chip provided in some embodiments of the present disclosure.

FIG. 4 is a schematic diagram of a driving chip provided in other embodiments of the present disclosure, and as shown in FIG. 4, the driving chip 10 further includes a storage module 12, which stores correspondences between different configuration rules and configuration sub-signals. The configuration rules indicate rules for configuring which of the first signal port 101 and the second signal port 102 implements the input function and which of the first signal port 101 and the second signal port 102 implements the output function. Table 1 shows a correspondence between configuration rules and configuration sub-signals stored in the storage module 12 provided in an example.

TABLE 1

| configuration rules | the first signal port 101 serves as the signal input port, and the second signal port 102 serves as the signal output port | the first signal port 101 serves as the signal output port, and the second signal port 102 serves as the signal input port |
|---|---|---|
| configuration sub-signal | 110 | 101 |

As shown in table 1, two configuration rules may be stored in the storage module 12, the first configuration rule is that the first signal port 101 serves as the signal input port, and the second signal port 102 serves as the signal output port; the second configuration rule is that the first signal port 101 serves as the signal output port, and the second signal port 102 serves as the signal input port. The configuration sub-signal corresponding to the first configuration rule is "110", and the configuration sub-signal corresponding to the second configuration rule is "101". In "110" and "101", "1" indicates a high level, and "0" indicates a low level.

The logic control module 11 may include: a first determination sub-circuit 111, a second determination sub-circuit 112 and a configuration sub-circuit 113.

The first determination sub-circuit 111 is configured to, in response to that one of the first signal port 101 or the second signal port 102 receives the configuration signal, determine a target configuration sub-signal corresponding to the driving chip 10 according to the configuration signal received by the first signal port 101 or the second signal port 102 and a preset communication rule.

In some implementations, the configuration signal includes: at least one configuration sub-signal and a flag signal located following the at least one configuration sub-signal. The preset communication rule includes: acquiring a first configuration sub-signal in the configuration signal and using the first configuration sub-signal as a target configuration sub-signal corresponding to the driving chip 10.

The second determination sub-circuit 112 is configured to determine a target configuration rule corresponding to the target configuration sub-signal according to the target configuration sub-signal and the correspondences.

The configuration sub-circuit 113 is configured to configure one of the first signal port 101 or the second signal port 102 as the signal input port and the other of the first signal port 101 or the second signal port 102 as the signal output port according to the target configuration rule; and remove the target configuration sub-signal from the configuration signal to obtain the updated configuration signal, and output the updated configuration signal through the signal output port.

For example, as shown in FIG. 3, the light emission driver includes ten driving chips 10 cascaded, each driving chip 10 has two sides parallel and opposite to each other, the first signal port 101 and the second signal port 102 of each driving chip 10 are respectively disposed close to the two sides, the first signal port 101 of each driving chip 10 is closer to the driving circuit board 30 than the second signal port 102 of the driving chip 10, and the ten driving chips 10 are arranged in five rows and two columns, i.e., two driving chip columns are formed. The driving chip at the $n^{th}$ stage and the driving chip at the $(11-n)^{th}$ are located in a same row, one driving chip column includes the driving chips 10, which are cascaded, at the first stage to the fifth stage, the other driving chip column includes the driving chips 10, which are cascaded, at the sixth stage to the tenth stage, and the driving chip 10 at the fifth stage and the driving chip 10 at the sixth stage are located in a same row and are cascaded with each other. In the driving chips at the first stage to the fifth stage, the first signal port 101 of the driving chip 10 at a certain stage is connected with the second signal port 102 of the driving chip 10 at a previous stage; in the driving chips from the sixth stage to the tenth stage, the second signal port 102 of the driving chip 10 at a certain stage is connected with the first signal port 101 of the driving chip 10 at a previous stage; the second signal port 102 of the driving chip 10 at the sixth stage is connected with the second signal port 102 of the driving chip 10 at the fifth stage. The storage module 12 stores therein correspondences between the configuration rules and the configuration sub-signals as shown in table 1. During configurating the functions of the first signal port 101 and the second signal port 102 of each driving chip 10, the driving circuit board 30 transmits a configuration signal to the driving chip 10 at the first stage, the configuration signal may be a data group including a target configuration sub-signal and a flag signal for the ten driving chips 10, for example, the configuration signal may be sequentially encoded according to "110 110 110 110 110 101 101 101 101 101 000", "000" is the flag signal. After the driving chip 10 at the first stage receives the configuration signal, the first determination sub-circuit 111 obtains the first configuration sub-signal "110" as a target configuration sub-signal thereof, and the second determination sub-circuit 112 can determine a target configuration rule corresponding to "110" according to table 1, so that the configuration sub-circuit 113 configures the first signal port 101 as the signal input port and the second signal port 102 as the signal output port. In addition, the driving chip 10 at the first stage outputs "110 110 110 110 101 101 101 101 101 000" to the driving chip 10 at the second stage, the reset can be deduced from this, and each driving chip 10 configures the functions of the first signal port 101 and the second signal port 102 thereof according to the same processing procedure as above. The configuration signal received by the driving chip 10 at the last stage is "101 000", so that the driving chip 10 at the last stage configures the first configuration sub-signal "101" as the target configuration sub-signal thereof, and further determines the target configuration rule corresponding to "101" according to table 1, and the configuration sub-circuit 113 configures the first signal port 101 as the signal output port and the second signal port 102 as the signal input port. In addition, the driving chip 10 at the last stage outputs "000" to the driving circuit board 30, and after receiving such signal, the driving circuit board 30 determines that the configuration of the functions of the first signal port 101 and the second signal port 102 of the driving chip 10 at each stage is completed.

Figure 5:
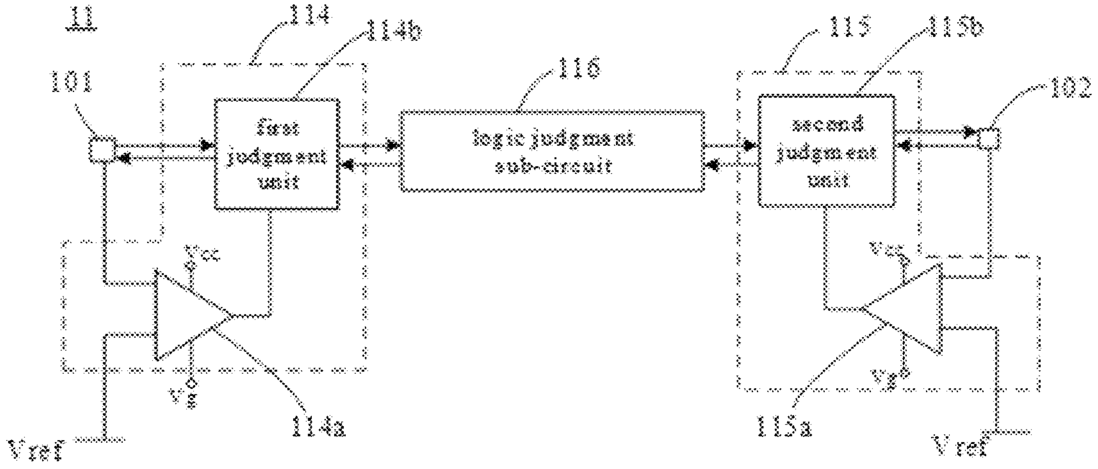
FIG. 5 is a schematic diagram of a driving chip provided in some embodiments of the present disclosure.

FIG. 5 is a schematic diagram of a driving chip provided in other embodiments of the present disclosure, the driving chip 10 shown in FIG. 5 is an implementation of the driving chip 10 shown in FIG. 2, and as shown in FIG. 5, the logic control module 11 includes: a first judgment sub-circuit 114, a second judgment sub-circuit 115 and a logical judgment sub-circuit 116.

The first judgment sub-circuit 114 is connected to the first signal port 101, a reference voltage terminal Vref, and the logic judgment sub-circuit 116, and the first judgment sub-circuit 114 is configured to compare a voltage signal received by the first signal port 101 with a reference voltage of the reference voltage terminal Vref, and output a first judgment signal in response to that the voltage signal received by the first signal port 101 is greater than or equal to the reference voltage. The driving chip further includes a power module therein, and the power module can process a power signal received by the power port of the driving chip to generate the reference voltage provided by the reference voltage terminal Vref.

In an example, the first judgment sub-circuit 114 may include: a first voltage comparator 114*a* and a first judgment unit 114*b*. A first input terminal of the first voltage comparator 114*a* is connected to the first signal port 101, a second input terminal of the first voltage comparator 114*a* is connected to the reference voltage terminal Vref, and the first voltage comparator 114*a* is configured to compare the voltage signal received by the first signal port 101 with the reference voltage and output a first voltage signal in response to that the voltage signal received by the first signal port 101 is greater than or equal to the reference voltage.

The first judgment unit 114*b* is connected with an output terminal of the first voltage comparator 114*a* and the first signal port 101, and the first judgment unit 114*b* is configured to transmit the voltage signal received by the first signal port 101 to the logic judgment sub-circuit, and output the first judgment signal to the logic judgment sub-circuit in response to the first voltage signal. The first voltage signal may be an analog signal, and the first judgment signal may be a digital signal.

The second judgment sub-circuit 115 is connected to the second signal port 102, the reference voltage terminal Vref, and the logic judgment sub-circuit, and the second judgment sub-circuit 115 is configured to compare the voltage signal received by the second signal port 102 with the reference voltage, and output a second judgment signal in response to that the voltage signal received by the second signal port 102 is greater than or equal to the reference voltage.

In an example, the second judgment sub-circuit 115 may include: a second voltage comparator 115*a* and a second judgment unit 115*b*. The second voltage comparator 115*a* has a first input terminal connected to the second signal port 102 and a second input terminal connected to the reference voltage terminal Vref. The second voltage comparator 115*a* is configured to compare the voltage signal received by the second signal port 102 with the reference voltage and output a second voltage signal in response to that the voltage signal received by the second signal port 102 is greater than or equal to the reference voltage.

In addition, the first voltage comparator 114*a* and the second voltage comparator 115*a* are further connected to a first operating voltage terminal Vcc and a second operating voltage terminal Vg, the first operating voltage terminal Vcc is configured to receive a first operating voltage signal, and the second operating voltage terminal Vg is configured to receive a second operating voltage signal, so as to ensure normal operation of the first voltage comparator 114*a* and the second voltage comparator 115*a*. The driving chip may include a power module, and the power module may provide the first operating voltage signal for the first operating voltage terminal Vcc according to the power signal received by the power port of the driving chip. The second operating voltage signal may be a ground signal, and the second operating voltage terminal Vg may be connected to the ground port of the driving chip to obtain the ground signal received by the ground port.

The second judgment unit 115*b* is connected to an output terminal of the second voltage comparator 115*a* and the second signal port 102, and the second judgment unit 115*b* is configured to transmit a voltage signal received by the second signal port 102 to the logic judgment sub-circuit 116, and outputs a second judgment signal to the logic judgment sub-circuit 116 in response to the second voltage signal.

The logic judgment sub-circuit 116 is connected to the first judgment sub-circuit 114 and the first signal port 101, and is configured to determine, in response to the first judgment signal output by the first judgment sub-circuit 114, that the voltage signal received by the first signal port 101 is the configuration signal, configure the first signal port 101 as the signal input port, configure the second signal port 102 as the signal output port, and transmit the configuration signal to the second signal port 102. The logic judgment sub-circuit 116 is further configured to determine, in response to the second judgment signal output by the second judgment sub-circuit 115, that the voltage signal received by the second signal port 102 is the configuration signal, configure the second signal port 102 as the signal input port, configure the first signal port 101 as the signal output port, and transmit the configuration signal to the first signal port 101.

For example, the light emission driver includes ten driving chips 10, the ten driving chips 10 are cascaded, and the ten driving chips 10 are arranged in two columns, and the connection manner is as described above with reference to FIG. 3. The driving chip 10 has the structure shown in FIG. 5. During configuring the functions of the first signal port 101 and the second signal port 102 of each driving chip 10, the driving circuit board 30 can transmit a configuration signal, for example, a voltage signal of 3.3V, to the driving chip 10 at the first stage. After the first signal port 101 of the driving chip 10 at the first stage receives the voltage signal of 3.3V, the first voltage comparator 114*a* outputs the first voltage signal in response to determining that the voltage signal received by the first signal port 101 is greater than the reference voltage; the first judgment unit 114*b* outputs the first judgment signal to the logic judgment sub-circuit according to the first voltage signal; moreover, the first judgment unit 114*b* transmits the voltage signal of 3.3V received by the first signal port 101 to the logic judgment sub-circuit, and the logic judgment sub-circuit determines that the first signal port 101 is the signal input port and the second signal port 102 is the signal output port according to the first judgment signal, and transmits the voltage signal of 3.3V to the second signal port 102 to be output to the driving chip 10 at the second stage. Similarly, after the first signal port 101 of the driving chip 10 at the second stage receives the voltage signal of 3.3V, the logic judgment sub-circuit can determine that the first signal port 101 is the signal input port and the second signal port 102 is the signal output port, and it can be deduced from this, that the second signal ports 102 of the driving chips 10 at the sixth to tenth stages each receive the voltage signal of 3.3V, and therefore, the driving chips 10 at the sixth to tenth stages each configure the second signal port 102 thereof as the signal input port and the first signal port 101 thereof as the signal output port. After the driving chip 10 at the tench stage outputs the voltage signal of 3.3V from the signal output port to the driving circuit board 30, the driving circuit board 30 can determine, according to the voltage signal of 3.3V, that the configuration of the functions of the first signal port and the second signal port of each driving chip 10 is completed.

Figure 6A:
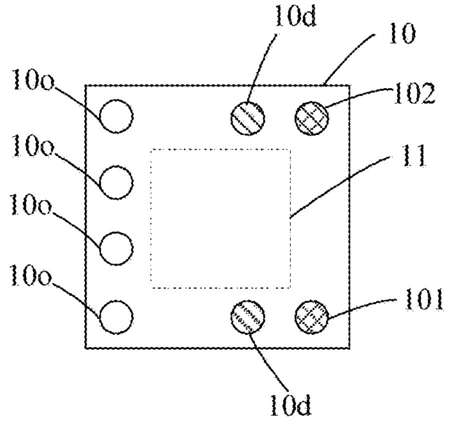
FIG. 6A is a schematic diagram illustrating a port distribution of a driving chip provided in some embodiments of the present disclosure.
Figure 6B:
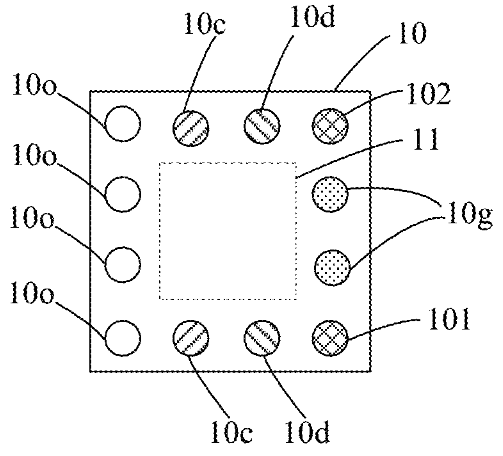
FIG. 6B is a schematic diagram illustrating a port distribution of a driving chip provided in some embodiments of the disclosure.

FIG. 6A is a schematic diagram illustrating a port distribution of the driving chip provided in some embodiments of the present disclosure, and FIG. 6B is a schematic diagram illustrating a port distribution of the driving chip provided in other embodiments of the present disclosure, as shown in FIGS. 6A and 6B, the driving chip 10 further includes: a first function port 10*d* and a plurality of driving ports 10*o*.

The first function port 10*d* and the driving ports 10*o* are all electrically connected to the logic control module 11, and the driving ports 10*o* are further electrically connected to light-emitting devices. The first function port 10*d* is configured to receive a test signal. The logic control module 11 is further configured to generate test currents respectively flowing through the driving ports 10*o* according to the test signal.

In some implementations, the test signal includes test data and first general address information, and the first general address information is matched with initialization address information of any one of the driving chips 10*o*. The logic control module (CTR) 11 is configured to generate, according to the test data, test currents respectively flowing through the driving ports 10*o*.

The same initialization address is set for the drive chips 10 by the factory. For example, the initialization address may be multiple consecutive bits of 0 or 1. The first general address information in the test signal is set to be the same as the initialization address of the driving chips 10. That is, in a case where the initialization address is the multiple consecutive bits of 0, the general address is correspondingly set to be multiple consecutive bits of 0. Therefore, the first general address information is matched with the initialization address information of all the driving chips 10, so that the logic control module 11 of the driving chip 10 obtains the test data in the test signal to generate the test currents respectively flowing through the driving ports 10*o*. The light-emitting device receives the test current and emits light. Therefore, lighting test of the light-emitting devices electrically connected with each driving chip 10 can be realized through a single detection operation, so that the maintenance efficiency of the driving chip 10 is effectively improved.

It should be noted that at least one of the driving ports 10*o* of the driving chip 10 is electrically connected to an end of the light-emitting device, and another end of the light-emitting device is electrically connected to a power line (not shown). The power line is configured to provide an operating voltage for the light-emitting device. As shown in FIG. 6B, the driving chip 10 further includes a ground port 10*g*, and the ground port 10*g* is configured to provide a ground voltage to the driving chip 10. Thus, the light-emitting device is equivalently connected between the power line and the ground port; the logic control module 11 identifies the address information and obtains test data in the test signal. The logic control module 11 controls conduction or cut-off of a current path of the light-emitting device according to the test data, thereby controlling the current flowing through the light-emitting device and the driving port 10*o*. In this case, in response to that the first function port 10*d* receives the test signal and transmits the test signal to the logic control module 11, the logic control module 11 identifies the first general address information and obtains the test data in the test signal. The logic control module 11 controls conduction or cut-off of a light-emitting current path of the light-emitting device according to the test data, thereby controlling the test current flowing through the light-emitting device and the driving port 10*o*.

In some implementations, the first function port 10*d* receives the test signal and the driving data in a time division manner. For example, in a time period, the first function port 10*d* receives the test signal, and in another period, the first function port 10*d* receives the driving data.

In a case where the first function port 10*d* receives the test signal, the test signal includes test data and first general address information, and the first general address information is matched with initialization address information of any one of the driving chips 10. The logic control module 11 is configured to generate, according to the test data, test currents respectively flowing through the driving ports 10*o*.

After the plurality of driving chips 10 are cascaded, in response to that the first function port 10*d* of each driving chip 10 receives the test signal, the logic control module 11 of the driving chip 10 can analyze the first general address information to obtain corresponding test data, thereby enabling the driving chip to supply a test current to the light-emitting device electrically connected thereto according to the test data.

Figure 6C:
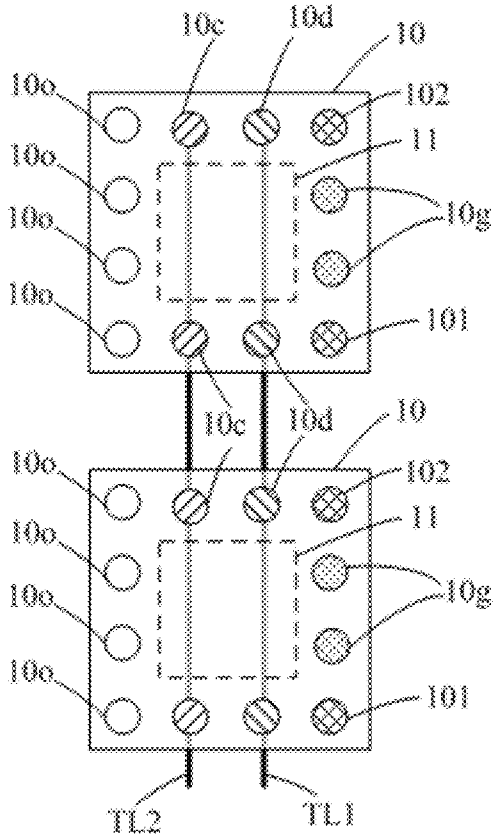
FIG. 6C is a schematic diagram illustrating connections between different driving chips provided in some embodiments of the present disclosure.

FIG. 6C is a schematic diagram illustrating connections between different driving chips provided in some embodiments of the present disclosure, and as shown in FIG. 6C, in an example, one or more first function ports 10*d* may be provided. A conductive layer (not shown) is disposed on a substrate, the conductive layer includes a first transmission line TL1, each driving chip 10 is located on a side of the conductive layer away from the substrate, and the first function port 10*d* of each driving chip 10 is connected to the first transmission line TL1, in this case, first function ports 10*d* of the driving chips 10 are connected in parallel on the first transmission line TL1, and the first function ports 10*d* of the driving chips 10 receive the same driving data. The driving data includes W pieces of address verification information and W pieces of driving information, each piece of address verification information and the corresponding one piece of driving information form an array, and W arrays are formed and sequentially arranged, for example, the W arrays may be sequentially arranged according to an order of the W driving chips 10 cascaded, or may also be sequentially arranged in an irregular order. The logic control module 11 is further configured to: receive, in response to that the address verification information is matched with the address information, corresponding driving information according to the address verification information, generate a driving current corresponding to at least one of the light-emitting devices connected to the driving chip 10 according to the driving information, and control at least one driving port 10*o* of the driving chip 10 to be electrically connected to the light-emitting device corresponding thereto, to form an electrical path between the at least one driving port 10*o* of the driving chip 10 and the light-emitting device corresponding thereto, the driving current flows in the electrical path. It should be noted that, after the first function port 10*d* of the driving chip 10 at each stage receives the driving data, the logic control module 11 of the driving chip 10 obtains the driving information, corresponding to the driving chip, in the driving data, so that the driving chip provides the driving current for the light-emitting device electrically connected to the driving chip according to the driving information.

As shown in FIG. 6C, the driving chip 10 may further include a power port 10C, and the power port 10C is connected to a power supply terminal of the driving circuit board 30. The power supply terminal provides the driving chip 10 with a desired operating voltage. One or more power ports 10*c* may be provided. The conductive layer further includes a second transmission line TL2, and the power port 10*c* of each driving chip 10 may be connected to the second transmission line TL 2.

Figure 6D:
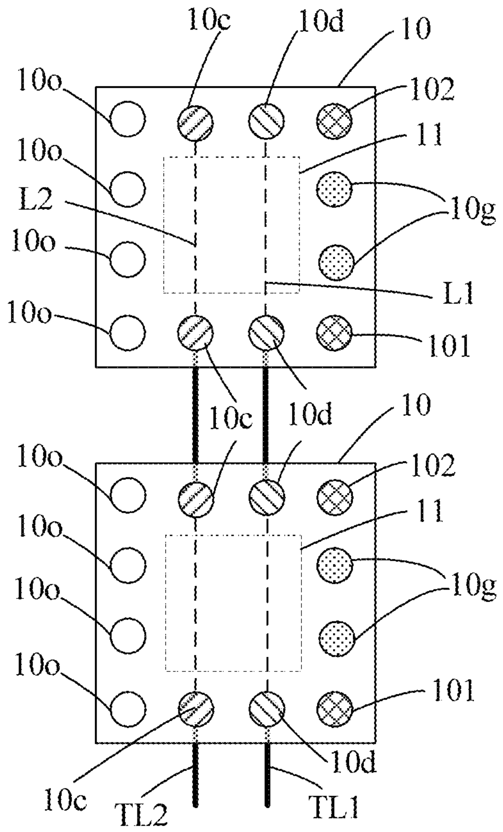
FIG. 6D is a schematic diagram illustrating connections between different driving chips provided in some embodiments of the present disclosure.

FIG. 6D is a schematic diagram illustrating connections between different driving chips provided in other embodiments of the present disclosure, as shown in FIG. 6D, in other examples, the driving chip 10 includes two first function ports 10*d*, and for a middle one of the driving chips 10 at adjacent three stages, one of the first function ports 10*d* is connected to the driving chip 10 at a previous stage through the first transmission line TL1, and the other of the first function ports 10*d* is connected to the driving chip 10 at a next stage through the first transmission line TL1. In the same driving chip 10, the two first function ports 10*d* are connected by a first connection line L1. In this case, the first transmission line TL1 is connected in series with the driving chips 10. In response to that one of the first function ports 10*d* of the driving chip 10 receives external driving data, the logic control module 11 of the driving chip 10 obtains driving information corresponding to the driving chip in the driving data, so that the driving chip provides the driving current for the light-emitting device electrically connected to the driving chip according to the driving information. In addition, the logic control module 11 of the driving chip 10 outputs the received driving data to the first function port 10*d* of the driving chip 10 at the next stage through the other of the first function ports 10*d* of the driving chip 10.

As shown in FIG. 6D, the driving chip 10 includes two power ports 10*c*, and for a middle one of the driving chips 10 at adjacent three stages, one of the power ports 10*c* is connected to the driving chip 10 at a previous stage through the second transmission line TL2, and the other of the power ports 10*c* is connected to the driving chip 10 at a next stage through the second transmission line TL2. In the same driving chip 10, the two power ports 10*c* are connected by a second connection line L2.

In summary, in each driving chip 10, the first function port 10*d* may be utilized to receive the test signal and the driving data in a time division manner. The first function port 10*d* is configured to receive the test signal during a test period for the driving chip 10. The first function port 10*d* is configured to receive the driving data during a normal operation period of the driving chip 10. In the embodiments, in a case where the first function port 10*d* receives the test signal and the driving data in the time division manner, no data port is to be arranged in the driving chip 10, which is beneficial to reducing a ratio of area occupation of the driving chip 10 and saving resources. Furthermore, in a case where the first function ports 10*d* of the driving chips 10 are connected in parallel on the first transmission line TL1, even if a fault of one of the driving chips 10 occurs, the other driving chips 10 can still receive the signal on the first transmission line TL1.

In some implementations, one of the first signal port 101 or the second signal port 102 serving as the signal input port can receive an address signal. The logic control module 11 can configure address information of the driving chip 100 according to the address signal and generate a relay signal, one of the first signal port 101 or the second signal port 102 serving as the signal output port can output the relay signal. That is, the initialization address information of each driving chip 10 is updated.

In some examples, the initialization address information and the address signal may be digital signals of a same type. For example, the initialization address information is 0. After receiving the address signal, each driving chip 10 may parse, obtain, and store the address information in the address signal, and may also increment the address signal by 1 or another non-0 fixed amount and modulate the incremented address signal (a new address signal) into the relay signal, so that the relay signal serves as an address signal of the driving chip 10 at the next stage. Certainly, the driving chip 10 may also adopt other different functions to update the address signal.

In the case where the first function port 10*d* receives the test signal, the test signal includes test data and second general address information. The second general address information is matched with the address information of each of the driving chips 10. The logic control module 11 is configured to generate, according to the test signal, test currents flowing through the driving ports 10*o* respectively.

It is understood that, in a period for configuring an address, if a problem occurs inside any driving chip 10 or in the connection between the driving chip 10 at the current stage and the driving chip 10 at the next stage, the address information of the driving chip 10 at the current stage and the driving chips cascaded thereafter cannot be updated. For example, the updated address information of first four driving chips 10 is 11111111, and the address information of all the subsequent driving chips 10 from the fifth driving chip 10 remains as the initialization address information of 00000000. The second general address information in the test signal is preset to 11111111, which is matched with the updated address information of the first four driving chips 10, that is, the light-emitting elements E electrically connected to the first four driving chips 10 can emit light normally. In such case, it is assumed that each light-emitting element E is normally soldered, but the second general address information in the test signal cannot be matched with the address information (the address information obtained by updating the initialization information) of the driving chips 10 from the fifth driving chip, that is, the logic control modules of the driving chips 10 from the fifth driving chip 10 cannot acquire the driving information from the driving data, so that the light-emitting devices electrically connected with the driving chips 10 from the fifth driving chip 10 cannot emit light.

Based on this, a judgment can be made according to whether or not all the light-emitting devices electrically connected to the respective driving chips 10 emit light. For example, if the light-emitting devices electrically connected to any driving chip 10 and the driving chips thereafter do not emit light, it can be determined that the first signal port 101 and the second signal port 102 of the certain driving chip 10 are in a problem of welding and are to be repaired.

In addition, as shown in FIGS. 6B to 6D, the driving chip 10 may further include a power port 10*c*, and the power port 10*c* is connected to the power supply terminal of the driving circuit board 30. The power supply terminal provides the driving chip 10 with the desired operating voltage.

Figure 7:
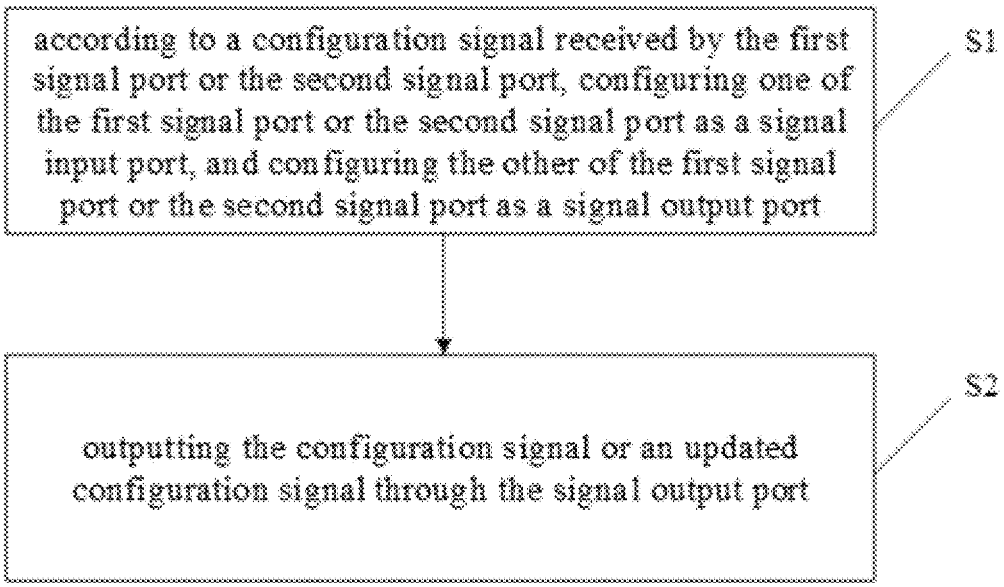
FIG. 7 is a schematic diagram of a method for configuring ports of a driving chip provided in some embodiments of the present disclosure.

An embodiment of the present disclosure further provides a method for configuring ports of a driving chip 10, where the driving chip 10 includes a first signal port 101 and a second signal port 102. FIG. 7 is a schematic diagram of a method for configuring ports of a driving chip provided in some embodiments of the present disclosure, and as shown in FIG. 7, the method includes the following S1 and S2.

At S1, according to a configuration signal received by the first signal port or the second signal port, configuring one of the first signal port or the second signal port as a signal input port, and configuring the other of the first signal port or the second signal port as a signal output port.

At S2, outputting the configuration signal or an updated configuration signal through the signal output port.

In some implementations, the S1 includes the following S11*a* to S13*a*.

At S11*a*, determining a target configuration sub-signal corresponding to the driving chip according to the configuration signal received by the first signal port or the second signal port and a preset communication rule.

The configuration signal includes: at least one configuration sub-signal and a flag signal located following the at least one configuration sub-signal. The preset communication rule includes: acquiring a first configuration sub-signal in the configuration signal, and taking the first configuration sub-signal as the target configuration sub-signal corresponding to the driving chip.

At S12*a*, determining a target configuration rule corresponding to the target configuration sub-signal according to the target configuration sub-signal and correspondences between configuration rules and configuration sub-signals.

At S13*a*, configuring one of the first signal port or the second signal port as the signal input port and configuring the other of the first signal port or the second signal port as the signal output port according to the target configuration rule.

The S2 includes: removing the target configuration sub-signal from the configuration signal to obtain the updated configuration signal, and outputting the updated configuration signal through the signal output port.

In some implementations, the S1 includes the following S11*b* to S13*b*.

At S11*b*, comparing a voltage signal received by the first signal port with a reference voltage, and outputting a first judgment signal in response to that the voltage signal received by the first signal port is greater than or equal to the reference voltage.

At S12*b*, comparing a voltage signal received by the second signal port with the reference voltage, and outputting a second judgment signal in response to that the voltage signal received by the second signal port is greater than or equal to the reference voltage.

At S13*b*, in response to the first judgment signal, determining that the voltage signal received by the first signal port is the configuration signal, configuring the first signal port as the signal input port, configuring the second signal port as the signal output port, and transmitting the configuration signal to the second signal port; and in response to the second judgment signal, determining that the voltage signal received by the second signal port is the configuration signal, configuring the second signal port as the signal input port, configuring the first signal port as the signal output port, and transmitting the configuration signal to the first signal port.

The process for configuring the functions of the first signal port and the second signal port of the driving chip is described above, and is not described herein again.

Figure 8:
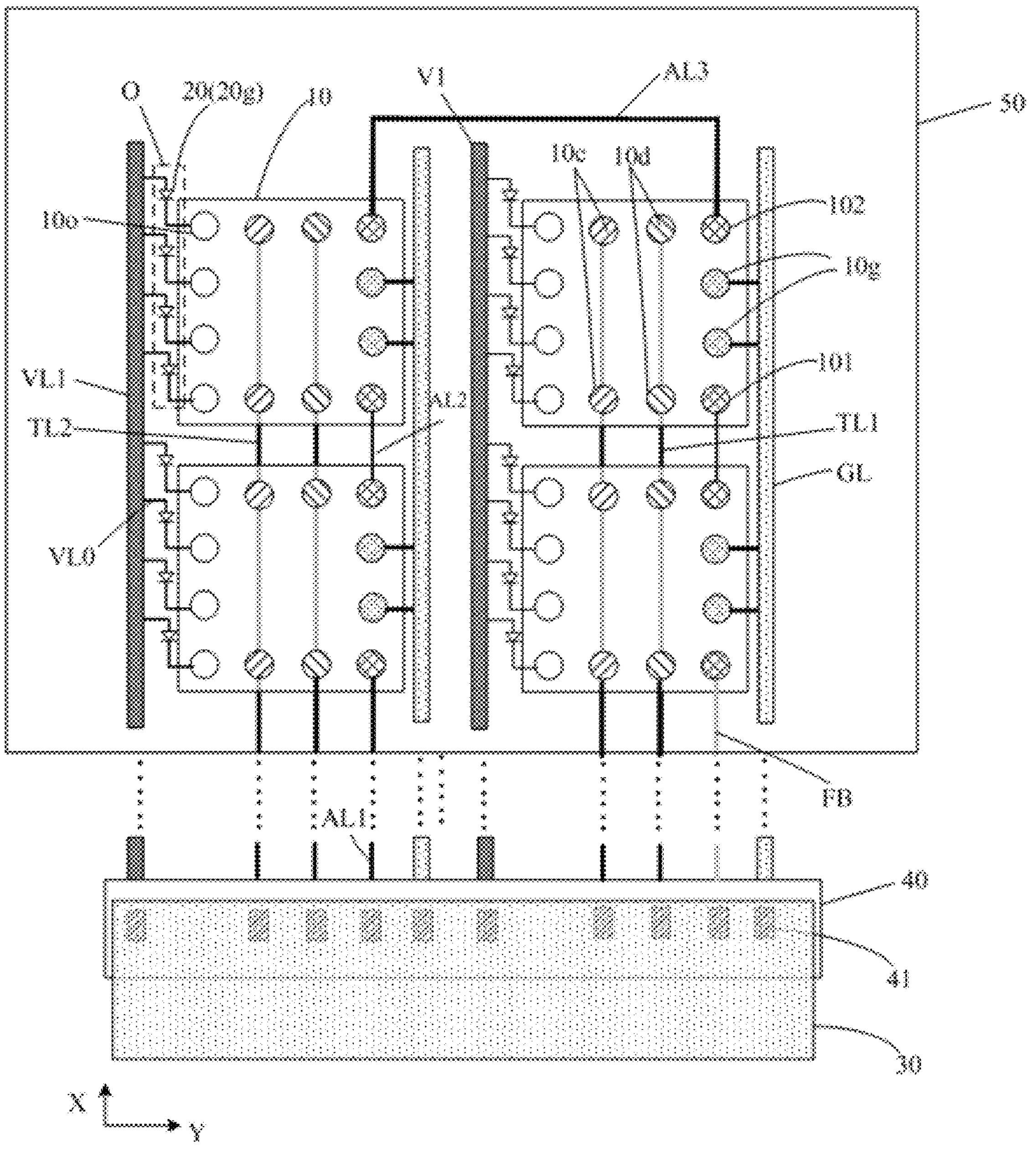
FIG. 8 is a schematic sachematic of a light emission driver and a light-emitting device provided in some embodiments of the present disclosure.

FIG. 8 is a schematic sachematic of a light emission driver and a light-emitting device provided in some embodiments of the present disclosure, and as shown in FIG. 8, the light emission driver includes: a driving circuit board 30 and a plurality of driving chips 10 cascaded, each driving chip 10 is the driving chip 10 in any one of the above embodiments.

The driving circuit board 30 is connected to the first signal port 101 or the second signal port 102 of the driving chip 10 at the first stage, and the first signal port 101 or the second signal port 102 of the driving chip 10 at the last stage, and the driving circuit board 30 is configured to output a configuration signal to the driving chip 10 at the first stage and receive a signal output by the driving chip 10 at the last stage.

The light emission driver further includes a base substrate including a light-emitting region and a bonding region 40 at a side of the light-emitting region, the driving chips 10 are disposed in the light-emitting region 50, the bonding region 40 is provided with a plurality of bonding pads 41, and the driving circuit board 30 is connected to the bonding pads 41 so as to provide signals to the driving chips 10 through the bonding pads 41.

The driving chips 10 in the light-emitting region 50 are arranged in N driving chip columns, each driving chip column including M driving chips 10 sequentially arranged in a direction away from the bonding region 40, M being an integer greater than 1. The driving chip 10 farthest from the bonding region in the $n^{th}$ driving chip column is cascaded with the driving chip 10 farthest from the driving circuit board 30 in the $(n+1)^{th}$ driving chip column, N is an integer greater than 1, and n is an odd number less than N.

In some implementations, N is an even number, and the driving chip 10 closest to the bonding region in the last driving chip column is connected to the driving circuit board 30 through the feedback signal line FB. Compared with the connection manner in FIG. 1, the embodiments of the present disclosure can reduce a length of the feedback signal line FB, thereby reducing a resistance of the feedback signal line FB and improving the signal transmission quality.

In addition, in each driving chip 10, the first input port 101 is located on a side of the driving chip 10 close to the bonding region 40, and the second signal port 102 is located on a side of the driving chip 10 away from the bonding region 40, so as to facilitate batch arrangement of the driving chips 10 on the base substrate. The second signal port 102 of the driving chip 10 farthest from the bonding region 40 in the $n^{th}$ driving chip column is connected with the second signal port 102 of the driving chip 10 farthest from the bonding region 40 in the $(n+1)^{th}$ driving chip column, so as to prevent the connection line between the two driving chips 10 from intersecting with other signal lines. In some implementations, N is an even number, the first signal port 101 of the driving chip 10 at the first stage and the first signal port 101 of the driving chip 10 at the last stage are connected to the driving circuit board 30.

It should be understood that the driving chips 10 in the light-emitting region are cascaded together, and in a case where N is 2, the driving chip 10 closest to the bonding region 40 in the first driving chip column and the driving chip 10 closest to the bonding region 40 in the second driving chip column are both connected to the driving circuit board 30. In a case where N is an even number greater than 2, the driving chip 10 closest to the bonding region 40 in the first driving chip column and the driving chip 10 closest to the bonding region 40 in the last driving chip column are both connected to the driving circuit board 30, and the driving chip 10 closest to the bonding region 40 in the $Q^{th}$ driving chip column is connected to the driving chip 10 closest to the bonding region 40 in the $(Q+1)^{th}$ driving chip column, Q is an even number less than N.

As shown in FIG. 8, the light emission driver further includes an address signal line AL1, a first transfer line AL2, and a second transfer line AL3, the address signal line AL1 and the feedback signal line FB extend along a first direction X, and the address signal line AL1 is connected to the first signal port 101 of the driving chip 10 closest to the bonding region 40 in the first driving chip column, and the feedback signal line FB is connected to the first signal port 101 of the driving chip 10 closest to the bonding region 40 in the last driving chip column. In such way, the driving chip 10 closest to the bonding region 40 in the first driving chip column and the driving chip 10 closest to the bonding region 40 in the last driving chip column are both connected to the driving circuit board 30.

Here, "the first driving chip column" and "the last driving chip column" refer to the first driving chip column and the last driving chip column arranged in a second direction Y.

For two adjacent driving chips 10 in the same driving chip column, the second signal port 102 of the driving chip 10 close to the bonding region 40 is connected with the first signal port 101 of the driving chip 10 away from the bonding region 40 through the first transfer line AL2. The second signal port 102 of the driving chip 10 farthest from the bonding region 40 in the $n^{th}$ driving chip column is connected to the second signal port 102 of the driving chip 10 farthest from the driving circuit board 30 in the $(n+1)^{th}$ driving chip column through the second transfer line AL3, n is an odd number less than N.

In a case where N is an even number greater than 2, and the driving chip 10 closest to the bonding region 40 in the $Q^{th}$ driving chip column is cascaded with the driving chip 10 closest to the bonding region 40 in the $(Q+1)^{th}$ driving chip column, a part of a connection line therebetween may be disposed on the driving circuit board 30. Specifically, the connection line may include: a first connection portion, a second connection portion and a third connection portion, the first connection portion is connected with the driving chip 10 closest to the bonding region 40 in the $Q^{th}$ driving chip column and is located on the base substrate; the second connection portion is connected with the driving chip 10 closest to the bonding region 40 in the $(Q+1)^{th}$ driving chip column and is located on the base substrate; the third connection portion is connected between the first connection portion and the second connection portion, and is located on the driving circuit board 30, thereby preventing the connection line from intersecting other signal lines to cause circuit-short therebetween.

In the embodiments of the present disclosure, the $n^{th}$ driving chip column, the $(n+1)^{th}$ driving chip column, the $Q^{th}$ driving chip column, and the $(Q+1)^{th}$ driving chip column refer to the $n^{th}$ driving chip column, the $(n+1)^{th}$ driving chip column, the $Q^{th}$ driving chip column, and the $(Q+1)^{th}$ driving chip column from left to right in FIG. 8.

As shown in FIG. 8, in the case where the driving chip 10 further includes a first function port 10*d*, a power port 10*c* and a ground port 10*g*, the light emission driver further includes a first transmission line TL1, a second transmission line TL2 and a power line VL1, the first transmission line TL1, the second transmission line TL2, the power line VL1, the feedback signal line FB and the above-mentioned address signal line AL1, the first transfer line AL2 and the second transfer line AL3 may all be disposed in a conductive layer on the base substrate, and the driving chips 10 are located on a side of the conductive layer away from the base substrate.

Each driving chip 10 is connected to one device group O, each device group O includes at least one light-emitting unit 20*g*, and each light-emitting unit 20*g* includes one or more light-emitting devices 20. A first terminal of each light-emitting unit 20*g* is connected to one of the driving ports 10*o* of the driving chip 10.

The power line VL1 extends in the first direction X, and light-emitting units 20*g* in each device group O are arranged in the first direction X. The power line VL1 is provided to be electrically connected to a second terminal of each light-emitting unit 20*g* to supply a first voltage to the light-emitting unit 20*g*. Moreover, since the light-emitting units 20*g* in each device group O are arranged in the first direction X, in response to that all the light-emitting units 20*g* in each device group O are connected to the same power line VL1, they may be connected to the power line VL1 through conductive lines VL0, each conductive line VL0 extends in the second direction Y, or each conductive line VL0 is a broken line. The conductive lines VL0 are not overlapped, and a design of single-layer wiring on the base substrate is facilitated. The first direction X and the second direction Y intersect and are parallel to the base substrate. For example, the first direction X and the second direction Y are perpendicular to each other. It is understood that in other embodiments, an included angle between the first direction X and the second direction Y may be an obtuse angle or an acute angle.

In some examples, the driving chips 10 cascaded are arranged into a plurality of driving chip columns in the second direction Y, each driving chip column including multiple driving chips 10 arranged along the first direction X, the driving chips 10 in the same driving chip column may be connected to the same power line VL1.

As shown in FIG. 8, the ground port 10*g* of the driving chip 10 is connected to a ground line GL, and thus is connected to a ground signal terminal of the driving circuit board 30 through the ground line GL so as to receive a ground signal.

The ground line GL extends along the first direction X, is located outside the driving chip 10, and is close to the ground port 10*g*. Since the ground line GL is to be electrically connected to at least one ground port 10*g* of each driving chip 10, the ground line GL is disposed closest to the ground port 10*g* so that the ground line GL can be electrically connected with the ground port 10*g* conveniently, and the ground line GL can be prevented from overlapping with other signal lines.

The first transmission line TL1 extends along the first direction X, the first function port 10*d* of each driving chip 10 is connected to the first transmission line TL1, and the first function port 10*d* is electrically connected to the driving circuit board 30 through the first transmission line TL1. The first transmission line TL1 is configured to transmit a test signal and driving data in time division manner.

In some implementations, first function ports 10*d* of the driving chips 10 in the same driving chip column may be connected to the same first transmission line TL1, so that even if a fault of any driving chip 10 occurs, the first function ports 10*d* of other driving chips 10 are not affected, and still can receive signals.

In some implementations, any two adjacent first function ports 10*d* of any two adjacent driving chips 10 in the same driving chip column are connected through the first transmission line TL1, and the first transmission line TL1 is further configured to connect one of the first function ports 10*d* of the driving chip 10 at the first stage close to the bonding region 40 with the driving circuit board 30, and connect one of the first function ports 10*d* of the driving chip 10 at the last stage close to the bonding region 40 with the driving circuit board 30. Any two first function ports 10*d* of each driving chip 10 are connected by the first connection line L1 described above.

As shown in FIG. 8, the light emission driver further includes a second transmission line TL2, and the power port 10*c* of the driving chip 10 is connected to the power supply terminal of the driving circuit board 30 through the second transmission line TL2 to receive a power signal provided by the driving circuit board 30.

In some examples, power ports 10*c* of the driving chip 10 in the same driving chip column may be connected to the same second transmission line TL2, so that even if a fault of any driving chip 10 occurs, the power ports 10*c* of other driving chips 10 are not affected, and can receive signals. In this case, one or more power ports 10*c* may be provided in each driving chip 10.

In other examples, each driving chip 10 includes two power ports 10*c*, any two adjacent power ports 10*c* of any two adjacent driving chips 10 in the same driving chip column are connected through the second transmission line TL2, and the second transmission line TL2 is further configured to connect one of the power ports 10*c* of the driving chip 10 at the first stage close to the bonding region 40 with the driving circuit board 30, and connect one of the power ports 10*c* of the driving chip 10 at the last stage close to the bonding region 40 with the driving circuit board 30. The two power ports 10*c* of each driving chip 10 are connected through a second connection line L2.

An embodiment of the present disclosure further provides a backlight module, as shown in FIG. 8, the backlight module includes: a light emission driver and a plurality of device groups O, the light emission driver being the light emission driver in any one of the above embodiments. Each device group O corresponds to one driving chip 10.

In some examples, each device group includes at least one light-emitting unit 20*g*, and each light-emitting unit 20*g* may include at least one light-emitting device 20, FIG. 8 is described by taking a case where each light-emitting unit 20*g* includes one light-emitting device 20 as an example. Certainly, in other examples, each light-emitting unit 20*g* may include two or more light-emitting devices 20 electrically connected to each other. In a case where each light-emitting unit 20*g* includes two or more light-emitting devices 20, the two or more light-emitting devices 20 may be connected in series, in parallel, or in a combination of series and parallel.

The light-emitting device 20 may be a Micro light-emitting diode (Mini-LED/Micro-LED). A first electrode of the light-emitting device 20 is connected to a first power line VL1, the first power line VL1 is connected to the driving circuit board 30 to receive a first power signal provided from the driving circuit board 30, and a second electrode of the light-emitting device 20 is connected to the output port 10*o* of the driving chip 10.

In the embodiment of the present disclosure, the functions of the first signal port 101 and the second signal port 102 of the driving chip 10 are not fixed, but after a plurality of driving chips 10 are cascaded, each driving chip 10 configure the functions of the first signal port 101 and the second signal port 102 according to a received configuration signal, so that during mounting the driving chips 10 on a base substrate, the first signal ports 101 of the driving chips 10 may be uniformly disposed at a side close to the bonding region, and during cascading the $n^{th}$ driving chip column with the $(n+1)^{th}$ driving chip column, the second signal ports 102 of the two driving chips 10 farthest from the bonding region in the two driving chip columns may be cascaded, thereby preventing a connection line connecting the two driving chips 10 from intersecting with other signal lines and causing short-circuit therebetween. In addition, a connection line connecting the driving chip 10 at the last stage with the driving circuit board does not occupy space in a width direction thereof, so that an area of a non-light-emitting region in the backlight module is reduced, and the bezel of the display product is reduced.

Figure 9:
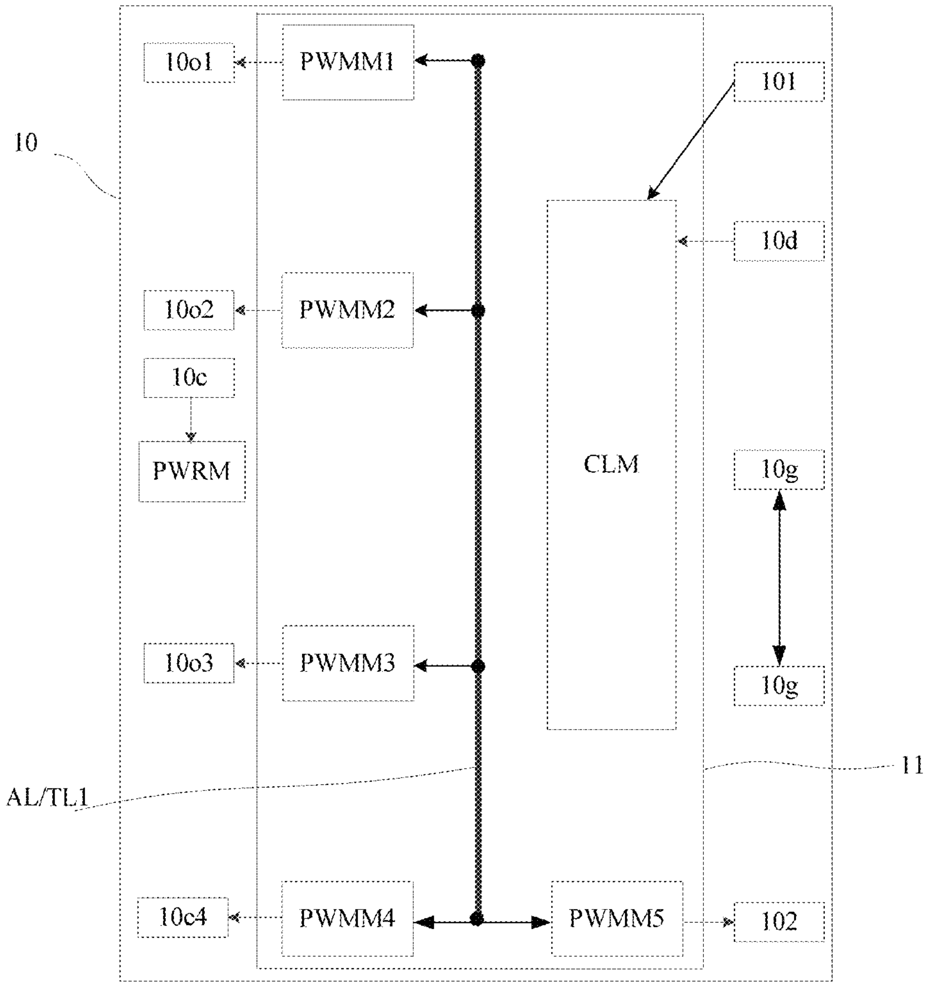
FIG. 9 is a circuit block diagram of a driving chip provided in some embodiments of the present disclosure.

FIG. 9 is a circuit block diagram of a driving chip provided in some embodiments of the present disclosure, and as shown in FIG. 9, the driving chip 10 includes a first signal port 101, a second signal port 102, a first function port 10*d*, a ground port 10*g*, and a power port 10*c*.

The driving chip 10 further includes four driving ports 10*o*. The four driving ports 10*o* include a first driving port 10*o*1, a second driving port 10*o*2, a third driving port 10*o*3 and a fourth driving port 10*o*4.

The logic control module 11 includes four modulation modules, which includes a first modulation module PWMM1, a second modulation module PWMM2, a third modulation module PWMM3, and a fourth modulation module PWMM 4. The logic control module 11 further includes a control unit CLM.

The first to fourth driving ports 10*o*1 to 10*o*4 are connected to the first to fourth modulation modules PWMM1 to PWMM4 in a one-to-one correspondence. The control unit CLM may include a first determination sub-circuit 111, a second determination sub-circuit 112, and a configuration sub-circuit 113 in FIG. 4, or may include a first judgment sub-circuit 114, a second judgment sub-circuit 115, and a logic judgment sub-circuit 116 in FIG. 5. In addition, the control unit CLM may further include a driving sub-circuit configured to generate a first driving control signal, a second driving control signal, a third driving control signal, and a fourth driving control signal according to the driving data and transmit them to the first modulation module PWMM1, the second modulation module PWMM2, the third modulation module PWMM3, and the fourth modulation module PWMM4, respectively.

The first modulation module PWMM1 is electrically connected to the first driving port 10*o*1, and may be conductive or cut off (i.e., allow a current flowing therethrough or not) under control of the first driving control signal, so that the first driving port 10*o*1 and the ground line GL electrically connected to the ground port 10*g* are electrically connected or disconnected.

In a case where the first modulation module PWMM1 is conductive, the ground line GL (as shown in FIG. 8), the first driving port 10*o*1, the light-emitting unit 20*g* (as shown in FIG. 8) electrically connected to the first driving port 10*o*1, and the power line VL1 (as shown in FIG. 8) form a signal loop, and the light-emitting unit 20*g* operates; in a case where the first modulation module PWMM1 is cut off, the signal loop is broken and the light-emitting unit 20*g* does not operate.

In this way, the first modulation module PWMM1 can perform phase modulation on a driving current flowing through the light-emitting unit 20*g* under the control of the first driving control signal, which is a kind of pulse width modulation signal. The first modulation module PWMM1 can modulate a duration of the driving current flowing through the light-emitting unit 20*g* according to the first driving control signal, thereby controlling an operating state of the light-emitting unit 20*g*. In a case where the light-emitting unit 20*g* includes an LED, a total light-emitting duration of the LED in a display frame can be increased by increasing a duty ratio of the first driving control signal, so as to increase total light-emitting brightness of the LED in the display frame, and increase brightness of a light-emitting substrate 200 in an area where the LED is located; conversely, by reducing the duty ratio of the first driving control signal (which is a pulse width modulation signal), the total light-emitting duration of the LED in a display frame can be reduced, so that the total light-emitting brightness of the LED in the display frame is reduced, and the brightness of the light-emitting substrate in the area where the LED is located is reduced.

Accordingly, the second modulation module PWMM2 is electrically connected to the second driving port 10*o*2 and may be conductive or cut off (i.e., allow a current flowing therethrough or not) under the control of the second driving control signal, which is a pulse width modulation signal. The third modulation module PWMM3 is electrically connected to the third driving port 10*o*3, and may be conductive or cut off (i.e., allow a current flowing therethrough or not) under the control of the third driving control signal, which is a pulse width modulation signal. The fourth modulation module PWMM4 is electrically connected to the fourth driving port 10*o*4, and may be conductive or cut off (i.e., allow a current flowing therethrough or not) under the control of the fourth driving control signal, which is a pulse width modulation signal.

In some implementations, the first to fourth modulation modules PWMM1 to PWMM4 may be switching elements, such as transistors, for example, metal-oxide semiconductor field effect transistors (MOS FETs), thin film transistors (TFTs), and the like; the first to fourth driving control signals may be pulse width modulation signals, and the switching elements may be turned on or off (i.e., conductive or cut off) under the control of the pulse width modulation signals.

In some implementations, with continued reference to FIG. 9, in a case where the address signal line AL is configured to transmit the address signal and the driving data in a time division manner, the first to fourth modulation modules PWMM1 to PWMM4 may be electrically connected to the control unit CLM through the address signal line AL, or each may be electrically connected to the control unit CLM through an address signal line AL separately, or may be electrically connected to the control unit CLM in other manners. In the case where the first transmission line TL1 is configured to transmit the test signal and the driving data in the time division manner, the first to fourth modulation modules PWMM1 to PWMM4 may be electrically connected to the control unit CLM through the first transmission line TL1, or each may be electrically connected to the control unit CLM through a first transmission line TL1, or may be electrically connected to the control module CLM in another manner, which is not limited in the present disclosure.

In some implementations, with continued reference to FIG. 9, the logic control module 11 may further include a fifth modulation module PWMM5, the fifth modulation module PWMM5 is electrically connected to the first signal port 101 and the second signal port 102. In a case where the control unit CLM determines the signal input port from the first signal port 101 and the second signal port 102, the control unit CLM can receive the address signal from the signal input port and generate a relay control signal according to the address signal and transmit the relay control signal to the fifth modulation module PWMM5; the fifth modulation module PWMM5 can generate, in response to the relay control signal, a relay signal and load it to the signal output port.

In some examples, the fifth modulation module PWMM5 may include a switching element, for example, a transistor such as an MOS transistor (metal-oxide semiconductor field effect transistor), a TFT (thin film transistor), or the like; the relay control signal may be a pulse width modulation signal, and the switching element is turned on or off (i.e., conductive or cut off) under the control of the pulse width modulation signal. In response to that the switching element is turned on, the fifth modulation module PWMM5 can output a current or a voltage, for example, the fifth modulation module PWMM5 generates a pulse width modulation signal as the relay signal to be output from the signal output port. In response to that the switching element is turned off, the fifth modulation module PWMM5 does not output any electrical signal (current or voltage).

In some implementations, the driving chip 10 may further include a power supply module PWRM that the power port 10*c* can load a power signal thereto, the power supply module PWRM being configured to distribute power to various circuits of the driving chip 10 to secure power supply of the driving chip 10.

For example, in a case where the control unit CLM has the structure shown in FIG. 5, the power supply module PWRM can provide the first power terminal Vcc, that the first and second voltage comparators 114*a* and 115*a* are connected thereto, with a first operating voltage signal according to the power signal received by the power port 10*c*, and provide the reference voltage to the reference voltage terminal Vref.

An embodiment of the present disclosure further provides a display apparatus, which includes the backlight module in the above embodiment. In addition, the display apparatus further includes a liquid crystal display panel, and the backlight module is configured to provide backlight for the liquid crystal display panel. The display apparatus is a product or a component with a display function, such as a mobile phone, a tablet personal computer, a display, a navigator, an electronic paper and the like.

It will be understood that the above embodiments are merely exemplary embodiments employed to illustrate the principles of the present disclosure, and the present disclosure is not limited thereto. It will be apparent to those skilled in the art that various changes and modifications can be made without departing from the spirit and scope of the present disclosure, and these changes and modifications are to be considered within the scope of the present disclosure.

What is claimed is:

1. A driving chip, comprising:

a first signal port and a second signal port;

a storage module having stored therein a computer program;

a processor, which is connected to the first signal port and the second signal port, and execues the computer program to configure, according to a configuration signal received by the first signal port or the second signal port, one of the first signal port or the second signal port as a signal input port, configure the other of the first signal port or the second signal port as a signal output port, and output the configuration signal or an updated configuration signal through the signal output port, wherein the storage module further has stored therein correspondences between configuration rules and configuration sub-signals, wherein the processor further executes the computer program to determine a target configuration sub-signal corresponding to the driving chip according to the configuration signal received by the first signal port or the second signal port and a preset communication rule;

determine a target configuration rule corresponding to the target configuration sub-signal according to the target configuration sub-signal and the correspondences; and configure, according to the target configuration rule, one of the first signal port or the second signal port as the signal input port and the other of the first signal port or the second signal port as the signal output port, and wherein the configuration signal comprises: at least one configuration sub-signal and a flag signal located following the at least one configuration sub-signal;

the preset communication rule comprises: acquiring a first configuration sub-signal in the configuration signal, and taking the first configuration sub-signal as the target configuration sub-signal corresponding to the driving chip; and the processor further executes the computer program to remove the target configuration sub-signal from the configuration signal to obtain the updated configuration signal, and output the updated configuration signal through the signal output port.

2. The driving chip of claim 1, wherein the processor further executes the computer program to:

compare a voltage signal received by the first signal port with a reference voltage and output a first judgment signal in response to that the voltage signal received by the first signal port is greater than or equal to the reference voltage;

compare a voltage signal received by the second signal port with the reference voltage and output a second judgment signal in response to that the voltage signal received by the second signal port is greater than or equal to the reference voltage; and determine, in response to the first judgment signal, that the voltage signal received by the first signal port is the configuration signal, configure the first signal port as the signal input port and configure the second signal port as the signal output port, and transmit the configuration signal to the second signal port; and configured to determine, in response to the second judgment signal, that the voltage signal received by the second signal port is the configuration signal, configure the second signal port as the signal input port and configure the first signal port as the signal output port, and transmit the configuration signal to the first signal port.

3. The driving chip of claim 1, wherein the signal input port receives an address signal; the processor further executes the computer program to configure address information of the driving chip according to the address signal and generate a relay signal; and the signal output port is configured to generate the relay signal.

4. The driving chip of claim 3, further comprising:

at least one driving port electrically connected with the processor;

a first function port electrically connected with the processor, and configured to receive driving data, and the driving data comprises pieces of address verification information and pieces of driving information corresponding to the pieces of address verification information, wherein the processor further executes the computer program to receive, in response to that the address verification information is matched with an address of the driving chip, corresponding driving information according to the address verification information, and generate a driving current corresponding to the at least one driving port according to the driving information.

5. The driving chip of claim 4, wherein the first function port is further configured to receive a test signal comprising test data and general address information, the general address information being matched with address information of each driving chip; and the processor further executes the computer program to generate a test current flowing through each driving port according to the test data.

6. A backlight module, comprising the light emission driver of claim 4 and a plurality of light-emitting devices, wherein each of the driving chips is connected to at least one of the light-emitting devices for driving the light-emitting device to emit light.

7. The driving chip of claim 1, further comprising:

at least one ground port electrically connected with the processor, and configured to receive a ground signal, and a power port electrically connected with the processor, and configured to receive a power signal.

8. A light emission driver, comprising a driving circuit board and a plurality of driving chips connected in a cascaded manner, wherein each driving chip is the driving chip of claim 1, wherein the driving circuit board is connected with the first signal port or the second signal port of a driving chip at a first stage, and the first signal port or the second signal port of a driving chip at a last stage, and is configured to output the configuration signal to the driving chip at the first stage and receive a signal output by the driving chip at the last stage.

9. The light emission driver of claim 8, further comprising: a base substrate comprising a light-emitting region and a bonding region located on a side of the light-emitting region, wherein a plurality of bonding pads are arranged in the bonding region, and the driving circuit board is connected with the driving chip through the bonding pads;

the driving chips are located in the light-emitting region and are arranged in N driving chip columns, and each driving chip column comprises multiple driving chips which are sequentially arranged along a direction away from the bonding region;

a driving chip of the plurality of driving chips which is farthest away from the bonding region in the $n^{th}$ driving chip column is cascaded with a driving chip of the plurality of driving chips which is farthest away from the bonding region in the $(n+1)^{th}$ driving chip column, wherein N is an integer greater than 1, and n is an odd number less than N.

10. The light emission driver of claim 9, wherein in each driving chip, the first input port is located at a side of the driving chip close to the bonding region, and the second signal port is located at a side of the driving chip away from the bonding region;

the second signal port of the driving chip which is farthest away from the bonding region in the $n^{th}$ driving chip column is connected with the second signal port of the driving chip which is farthest away from the bonding region in the $(n+1)^{th}$ driving chip column; and N is an even number, and the first signal port of the driving chip at the first stage and the first signal port of the driving chip at the last stage are connected with the driving circuit board.

11. The light emission driver of claim 8, further comprising: a conductive layer on a base substrate, wherein the conductive layer comprises a first transmission line; the driving chip is located on a side, away from the base substrate, of the conductive layer, and further comprises a first function port, and the first function port is electrically connected with the driving circuit board through the first transmission line.

12. The light emission driver of claim 8, further comprising: a conductive layer on a base substrate, wherein the conductive layer comprises a second transmission line; the driving chip is located on a side, away from the base substrate, of the conductive layer, and further comprises a power port, and the power port is connected with a power supply terminal of the driving circuit board through the second transmission line.

13. A method for configuring ports of a driving chip, the driving chip comprising a first signal port and a second signal port, the method comprising:

configuring, according to a configuration signal received by the first signal port or the second signal port, one of the first signal port or the second signal port as a signal input port, and the other of the first signal port or the second signal port as a signal output port, and outputting the configuration signal or an updated configuration signal through the signal output port, wherein the configuring, according to a configuration signal received by the first signal port or the second signal port, one of the first signal port or the second signal port as a signal input port, and the other of the first signal port or the second signal port as a signal output port comprises:

determining a target configuration sub-signal corresponding to the driving chip according to the configuration signal received by the first signal port or the second signal port and a preset communication rule;

determining a target configuration rule corresponding to the target configuration sub-signal according to the target configuration sub-signal and correspondences between configuration rules and configuration sub-signals;

configuring one of the first signal port or the second signal port as the signal input port and the other of the first signal port or the second signal port as the signal output port according to the target configuration rule, and wherein the configuration signal comprises: at least one configuration sub-signal and a flag signal located following the at least one configuration sub-signal;

the preset communication rule comprises: acquiring a first configuration sub-signal in the configuration signal, and taking the first configuration sub-signal as the target configuration sub-signal corresponding to the driving chip;

the outputting the configuration signal or an updated configuration signal through the signal output port comprises:

removing the target configuration sub-signal from the configuration signal to obtain the updated configuration signal, and outputting the updated configuration signal through the signal output port.

14. The method of claim 13, wherein the configuring, according to a configuration signal received by the first signal port or the second signal port, one of the first signal port or the second signal port as a signal input port, and the other of the first signal port or the second signal port as a signal output port comprises:

comparing a voltage signal received by the first signal port with a reference voltage, and outputting a first judgment signal in response to that the voltage signal received by the first signal port is greater than or equal to the reference voltage;

comparing a voltage signal received by the second signal port with the reference voltage, and outputting a second judgment signal in response to that the voltage signal received by the second signal port is greater than or equal to the reference voltage;

determining, in response to the first judgment signal, the voltage signal received by the first signal port as the configuration signal, configuring the first signal port as the signal input port, configuring the second signal port as the signal output port, and transmitting the configuration signal to the second signal port; and determining, in response to the second judgment signal, the voltage signal received by the second signal port as the configuration signal, configuring the second signal port as the signal input port, configuring the first signal port as the signal output port, and transmitting the configuration signal to the first signal port.

* * * * *